Figure 1:
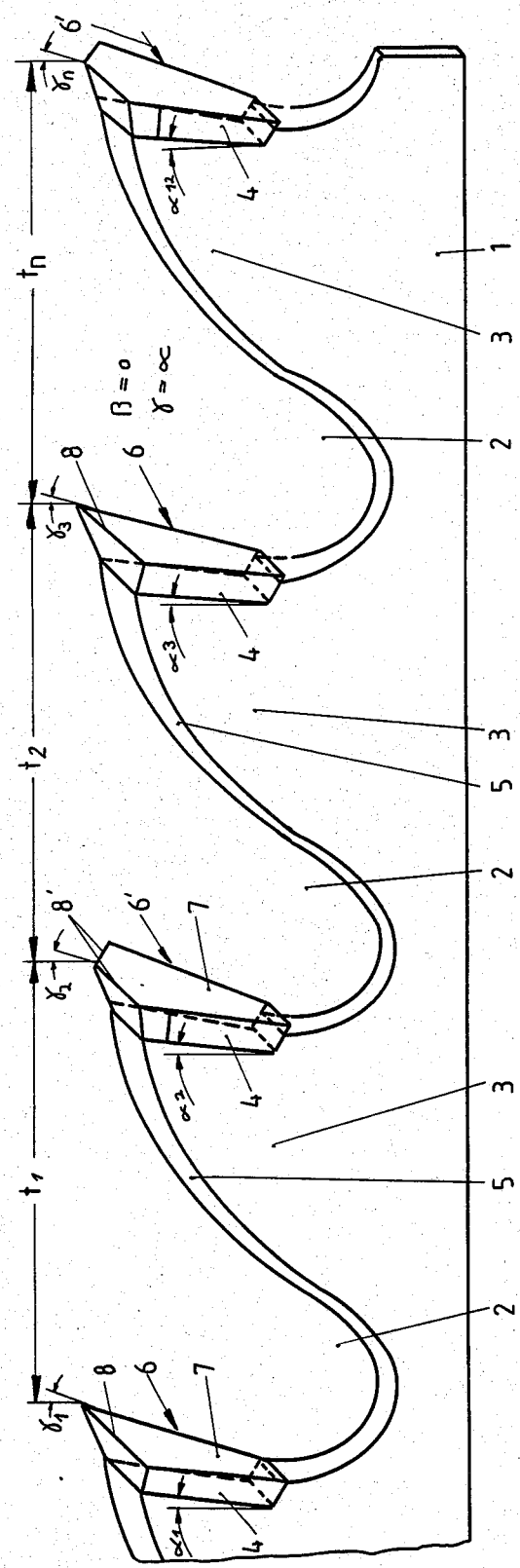

United States Patent [19]

Kullmann et al.

[11] Patent Number: 4,640,172
[45] Date of Patent: Feb. 3, 1987

[54] SAW BLADE

[75] Inventors: Rolf Kullmann; Jörg Kullmann, both of Spangenberg, Fed. Rep. of Germany

[73] Assignee: Wilhelm H. Kullmann Wikus-Sagenfabrik, Fed. Rep. of Germany

[21] Appl. No.: 583,830

[22] Filed: Feb. 27, 1984

[30] Foreign Application Priority Data

Mar. 1, 1983 [DE] Fed. Rep. of Germany ....... 3307170

[51] Int. Cl.⁴ ..................... B23D 61/00; B23D 61/04; B23D 61/14
[52] U.S. Cl. ........................................ 83/835; 83/847; 83/851
[58] Field of Search ................. 83/835, 846, 847, 851; 76/48, 25 R

[56] References Cited

U.S. PATENT DOCUMENTS

| | | | |
|---|---|---|---|
| 2,720,229 | 10/1955 | Drake | 143/140 |
| 3,576,061 | 4/1971 | Pahlitzsch | 83/851 X |
| 3,717,052 | 2/1973 | McKinney | 76/48 |
| 3,988,955 | 11/1976 | Engel et al. | 83/835 |
| 4,133,240 | 1/1979 | Vollmer et al. | 83/835 |
| 4,179,967 | 12/1979 | Clark | 83/846 |
| 4,214,499 | 7/1980 | Ellis | 83/835 |

FOREIGN PATENT DOCUMENTS

| | | | |
|---|---|---|---|
| 0009036 | 1/1982 | European Pat. Off. | |
| 0054885 | 6/1982 | European Pat. Off. | 83/851 |
| 0000498 | 9/1979 | World Int. Prop. O. | 83/846 |

Primary Examiner—James M. Meister
Assistant Examiner—John L. Knoble
Attorney, Agent, or Firm—Thomas & Kennedy

[57] ABSTRACT

A saw blade exhibits a foundation (1) of spring steel, which exhibits along one edge projections (3), each separated by a chip space (2), each carrying a seat (4) each for a cutting material plate (6, 6') and each forming a tooth back (5). The cutting material plates (6, 6') exhibit a cutting edge and a true rake (7) and are arranged at an effective rake angle (γ), while each two adjacent cutting material plates (6, 6') form a pitch (t) with the mutual interval of their cutting edges and/or cutting tips. The cutting material plates (6, 6') are attached with varying pitch (t) and with varying effective rake angle (γ).

9 Claims, 4 Drawing Figures

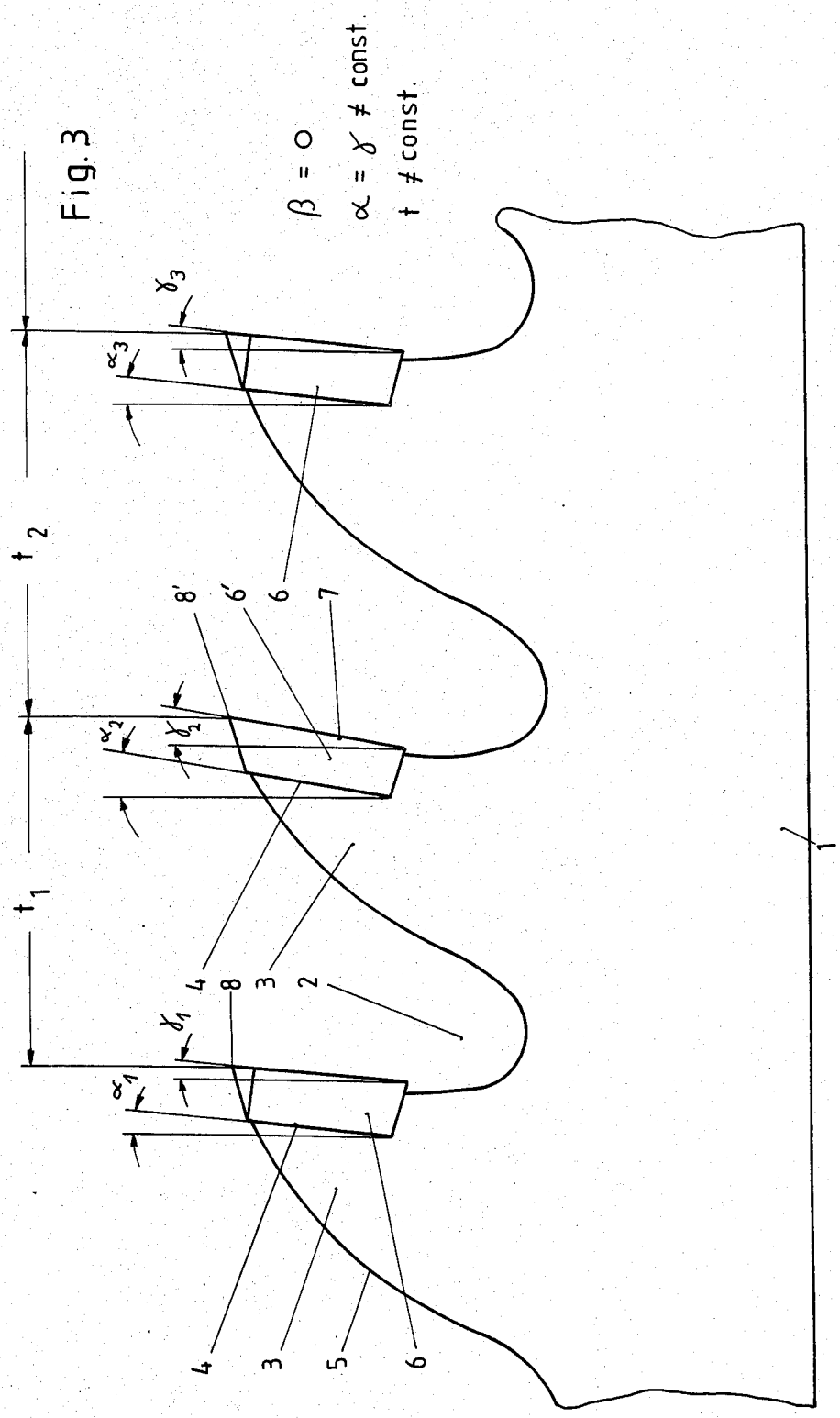

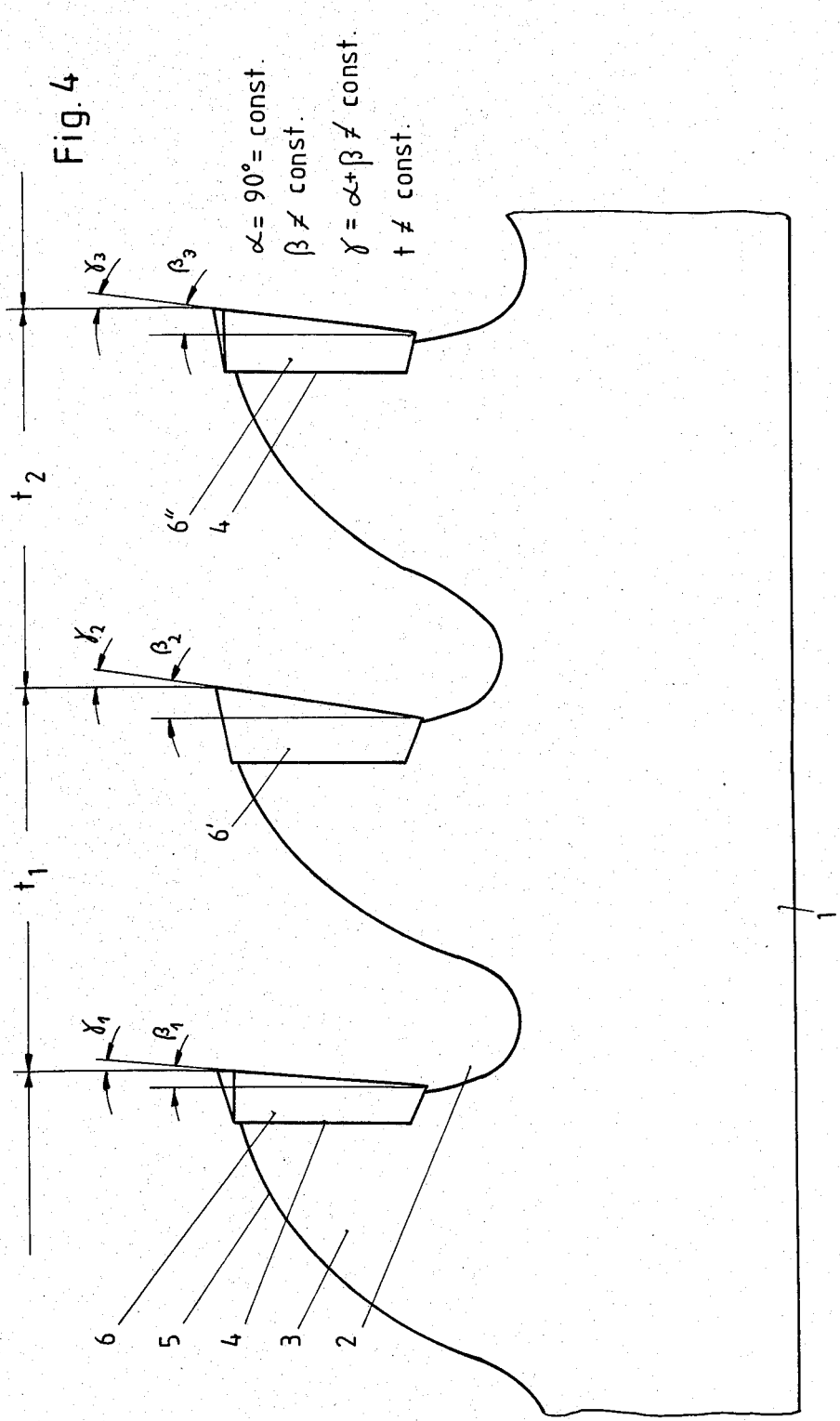

SAW BLADE

The invention relates to a saw blade with a foundation of particularly spring steel, which exhibits along one edge projections, each separated by a chip space, each carrying a seat each for a cutting material plate and each forming a tooth back, and with cutting material plates, attached to the projections, which exhibit a cutting edge and a true rake and are arranged at an effective rake angle, whilst each two adjacent cutting material plates form a pitch with the mutual interval of their cutting edges and cutting tips. Such a saw blade may be provided as a band-saw blade or bow-saw blade or also as a circular-saw blade, or also in the form of a keyhole-saw blade.

A saw blade of the type initially described is known from German Offenlegungsschrift No. 2,816,428. There cutting material plates particularly in the form of tungsten carbide cutting teeth are attached to the projections by hard soldering. The arrangement of the cutting material plates on the foundation is regular with regard to the pitch with which the cutting material plates are attached and with regard to the effective rake angle which the true rakes of the cutting material plates form, that is to say a specific saw blade always exhibits the same pitch and same effective rake angle in the region of all its teeth. The effective rake angle is restricted to the range of positive angles in order to achieve adequate stability of the cutting material plates on the projections. Saw blades of this type, particularly circular saw blades, emit considerable noise when they are used. In order to reduce this noise emission during sawing, the lateral faces of the cutting material plates are of concave construction in the known saw blade. However, the regular arrangement of the cutting material plates in congruent form, that is to say with equal pitch and equal effective rake angle, provides favorable conditions for the occurrence of the undesirable resonant vibrations. These resonant vibrations in turn cause the cut surface of the workpiece to exhibit scorings and ridges, that is to say to be uneven. These vibrations also lead to micro-tears on the cutting material plates, whereby the useful life of such saw blades is again reduced. Resonant vibrations can also be the cause of considerable noise emission during sawing and ultimately also lead to a considerable stressing of the saw, whether it be a band-saw, a bow-saw et cetera.

A saw blade for band-sawing or bow-sawing, particularly for working metal, is known from German Offenlegungsschrift No. 2,522,618. In the production of such saw blades a strip of high-speed steel is welded onto a foundation of spring steel in a high vacuum. The teeth are milled into the strip and into the foundation. After the milling the teeth are hardened in a partial region of the strip, however, the foundation is inevitably treated consonantly. The relief grinding of the tooth flanks follows next. The true rakes and the back surfaces are also ground. These grinding operations are relatively complicated, because due to the use of a wider strip of high-speed steel compared to the foundation of spring steel, grinding can proceed only by the use of interlays. The construction of the teeth may also be decided so that first-cutting teeth and second-cutting teeth are formed in mutual alternation. It is obvious that considerable importance is also attached to the relief grinding of the tooth flanks in the construction of such a saw blade. The disadvantages of this known saw blade are, besides the complicated production with interlays, the high material loss of high-speed steel, which has to be removed by milling and grinding, although per se this harder cutting material would only be required in the region of the tooth tips. Here again the teeth are arranged regularly, that is to say they have the same pitch and the same effective rake angle. Due to the construction of first cutters and second cutters, constantly repeated conditions for the removal of the chip from the workpiece are achieved at a very short distance. This is disadvantageous for the occurrence of vibrations.

Band-saw blades are also already known which, starting from a foundation of spring steel with a welded-on strip of high-speed steel, are processed so that a pitch varying from tooth to tooth with constant effective rake angle of the teeth is produced. By this means a specific sequence of different pitches, from tooth to tooth in each case, is formed, these pitches repeating themselves, a plurality of such pitch sequences being arranged in succession, repeating in a regular manner. This known saw blade has the disadvantage that the removal of material necessary by milling and grinding becomes particularly important in quantity and value with increasing tooth pitch. This is even more the case where, for example, in the production of band-saw blades for larger cross-sections, the chip space is enlarged by subsequently milling out and/or grinding off every second already finished tooth.

The known saw blades initially described, which are fitted with cutting material plates, particularly in the form of hard metal, advantageously make it possible to cut more simply even materials which are difficult to cut, to prolong the useful life and also to achieve shorter stroke times when cutting. However, all saw blades fitted with hard metal plates have the disadvantage that they do not sufficiently influence the cause which is based on the regularity of the chip formation, of the appearance of definite frequencies which may set up resonance with similarly placed frequencies of the machine-tool-workpiece system.

It is therefore the underlying aim of the invention to further develop a saw blade of the type initially described, so that in the chip removal process with the saw blade, that is to say during sawing, the frequencies determined by the construction of the saw blade are influenced so that resonance with similarly placed frequencies of the machine-tool-workpiece system is avoided so far as possible.

This is achieved according to the invention in that the cutting material plates are attached with varying pitch and with varying effective rake angles. The invention starts from the discovery of creating the most widely different conditions at the individual cutting material plates during sawing, in order to avoid as comprehensively as possible similarly placed frequencies which may together set up resonances in the chip removal process which are prejudicial to or negatively influence the latter. The pitch substantially determines the chronological sequence of the appearance of the cutting forces when the cutting material plates penetrate into the material to be cut. The effective rake angle substantially influences the magnitude of the cutting forces which appear, their direction and the stressing of the joint between cutting material plates and the projections on the foundation. It has been discovered unexpectedly that by the combination of varying pitch and varying effective rake angle—although a number of further quantities are also critical for the appearance of similarly placed frequencies—is sufficient to arrive at optimally methodical working in the context of the purpose in view with maximum useful life, that is to say m² cut surface per band length or blade length, and with high specific cutting capacity. These characteristics of the saw blade according to the invention are particularly efficacious for cutting material which are difficult to cut, such as higher and high alloy steels, stones, glass compounds, et cetera, but also possess particular significance in the case of unalloyed low-carbon steels, which owing to their low self-damping characteristics tend strongly to resonances with frequencies of the machine-tool-workpiece system. The term "pitch" is to be understood to mean the interval from tooth front to tooth front, which is also to be measured and/or determined at different suitable points depending upon the embodiment. Where the cutting edge is arranged at right angles to the direction of movement of the cutting material plates in the cutting gap, the pitch is determined by the mutual interval of two consecutive cutting edges. If on the other hand the cutting edge is arranged obliquely to the direction of movement of the cutting material plates, a tooth tip is obtained, whilst the lateral projection of the tooth tips of adjacent cutting material plates determines the relevant pitch. Similar considerations apply if the cutting material plates are constructed and arranged as first cutters and second cutters. In this case therefore pitch sequences of respectively different consecutive pitches are created which may be provided constantly recurring on the saw blade. However, it also possible to create a very large sequence of pitches here, so that it is no longer possible to detect a regularity within limited dimensions of the saw blade. It is however essential to vary not only the pitch, but also the effective rake angle in combination therewith. This, in combination, influences not only the magnitude and direction of the cutting forces which appear, but also subsequently the chip formation frequencies. The detailed construction may be made so that sequences of different effective rake angle are formed, whilst the number of the individual different effective rake angles in a sequence need not necessarily conform to the number of the pitches in a pitch sequence.

The combination of a varying pitch and/or of a varying effective rake angle changing from tooth to tooth may be provided. In this manner even the simple repetition of identical conditions in the region of two consecutive teeth or cutting material plates can be prevented.

It is also possible with the construction of the saw blade according to the invention, to utilize all those advantages which already exist per se when a saw blade is fitted with cutting material plates: the cutting material plates may be completely or mainly finish-machined independently of the material of the foundation, whereupon, and only then, the attachment of the cutting material plates to the foundation is effected. The material of the foundation then remains tough and ductile, that is to say it is no longer negatively influenced by the hardening operation which is otherwise necessary. The cutting material plates may also be machined on all sides in the sense of the required relief grindings, so that only their fastening to the projections of the foundation is necessary. This fastening may be effected by soldering, welding or also by gluing, whilst the last-mentioned process step presents the particular advantage that it can be executed in a cold or quasi-cold state which does not influence the carrier material and cutting material plate.

The varying pitch within a pitch sequence may exhibit individual pitches which stand in a mutual ratio of up to 1:2.5. This means that the pitch can be varied within wide ranges within a pitch sequence, even so widely that, within a pitch sequence, 2.5 teeth are formed or cutting material plates provided on the distance determined by the maximum pitch at another point of the pitch sequence. However, such wide variations of the pitch are generally unnecessary.

Positive and/or negative effective rake angles may be provided as varying effective rake angles within an effective rake angle sequence. By varying in the range of the positive effective rake angle, a saw blade of high cutting capacity is produced. Negative effective rake angles produce high strengths. With an extension of the varying effective rake angles across both the stated ranges, a saw blade capable of particularly versatile use is obtained. In order to vary the effective rake angle where cutting material plates constructed of equal thickness along their length are used—that is to say with a constant rake angle of the cutting material plates $\beta = 0$—their seats may be arranged differently inclined on the projections, that is to say with a non-constant seat angle $\alpha$, so that different effective rake angles are produced even with congruent cutting material plates and attachment in different relative positions. However, it is also possible to use cutting material plates which are conformed differently, or at least partially differently, to each other.

The number of the different pitches in a pitch sequence may conform to the number of different effective rake angles in the effective rake angle sequence. Although this achieves a certain regularity, the latter is nevertheless advantageous in the sense of simple production facility. The number of the pitches and effective rake angles may also be chosen to be relatively large. Thus it is also possible to choose the number of the different pitches in a pitch sequence to be greater than the number of the different effective rake angles in an effective rake angle sequence, which again contributes to simplified production. A saw blade is produced which can be used for a wide range of workpiece dimensions. However, the number of the different pitches in a pitch sequence may also be smaller than the number of the different effective rake angles in an effective rake angle sequence, and this again renders the saw blade more universally useful. Stabler cutting behavior is achieved. In this case a pitch sequence is determined by the width of the milling cutter for the projections and chip space.

The cutting material plates may consist of hard metal, high-speed steel, ceramic cutting material et cetera. The ceramic cutting material may be single-layer or multi-layer cutting material, for example Cermet. Cutting material plates consisting of hard metal produce particularly good cut surfaces and are also suitable for high-strength materials which are difficult to cut. If the cutting material plates consist of high-speed steel, similar characteristics are obtained as for a saw blade with a strip of high-speed steel welded onto the foundation, however, the material losses in production are considerably smaller. It is also possible for the cutting material plates of high-speed steel and the foundation each to be treated separately, and hence optimally according to the relevant desiderata. Lastly, it is also possible to provide the cutting material plates with a wear-inhibiting coating, which is applied before the attachment of the cutting material plates to the foundation.

According to the invention, a method of producing a saw blade of the stated type consists in that the foundation is produced with varying pitch of the projections and with varyingly inclined seats on the projections, and that identical or non-identical cutting material plates are attached to the seats. Particularly, the use of identical cutting material plates is favorable inasmuch as the varying pitch and the varying effective rake angles are thereby generated virtually automatically, without any finishing work being necessary, for example by grinding et cetera. The seats on the projections for the cutting material plates may be produced by milling and/or grinding in combination with a pressing and upsetting operation in order to vary the effective rake angle. A setting of the projections is also not excluded, although setting is generally unnecessary and should also be avoided. The pressing and upsetting operation results in a cold consolidation of the material of the foundation at the fastening point for the cutting material plates. Simultaneously with this consolidation, the seat surface can also be upset wider, so that the cutting material plate can be attached even better to this surface enlarged in this way. However, it is also possible to grind the cutting material plates additionally after their attachment to the seats of the projections. However, any such grinding operation will refer to a finishing treatment. No further major formal variations should be necessary at this stage.

Another production method for the saw blades initially described is that the projections are produced on the foundation with regular pitch and with regular inclination of the seats, and that, where identical cutting material plates are used, a differently executed grinding operation follows or non-identical cutting material plates are attached to the seats.

Figure 2:
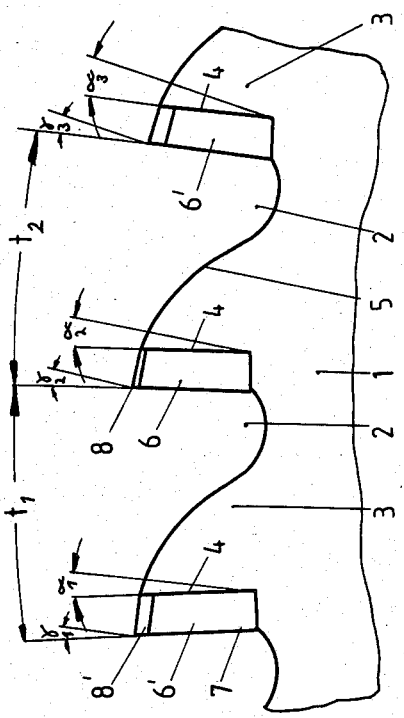

The invention is described more fully with reference to a number of forms of construction in the accompanying drawing, wherein:

FIG. 1 shows a perspective view of those parts of a band-saw blade relevant to the invention, FIG. 2 shows a side elevation of a part of a circular-saw blade, FIG. 3 shows a side elevation of a saw blade with variable pitch, with variable seat angle and with cutting material plates of equal thickness and FIG. 4 shows a side elevation of a saw blade with variable pitch, with constant seat angle and with conical different cutting material plates.

The band-saw blade illustrated in FIG. 1 has a foundation 1, which is formed particularly of ductile spring steel. Projections 3, which are formed along one edge of the band by milled chip spaces 2, each form and/or exhibit a seat 4 on their front side and a tooth back 5 on their rear side. Each seat 4 consists of a fairly large surface arranged approximately vertically or inclined and of a surface approximately at right angles to the side surfaces of the blade. The inclination of the seat 4 relative to the vertical plane or to the normal plane to the longitudinal direction of the band, is the seat angle $\alpha$. A cutting material plate 6,6' is attached to each of the seats 4. The cutting material plates 6, 6' have a rake angle which is designated the rake angle $\beta$. Because cutting material plates 6, 6' which are constant as regards their thickness across their vertical extension and of equal thickness are used, therefore, $\beta = 0 = \text{const}$. The relevant effective rake angle $\gamma$ is obtained from $\gamma = \alpha + \beta$; in this case as $\alpha = \gamma$ at each individual point. The different effective rake angles $\gamma_1$ to $\gamma_n$ indicate that the effective rake angles are provided varied so that $\gamma_1 \neq \gamma_2, \gamma_2 \neq \gamma_3 \ldots \gamma_{n-1} \neq \gamma_n$. Here n designates the number of the different effective rake angles in an effective rake angle sequence. It is clear that a plurality of similar (or also dissimilar) effective rake angle sequences may be realized consecutively on a band. The effective rake angles $\gamma_i$ marked are identical with the seat angles $\alpha_i$ when—as in the example of FIG. 1—cutting material plates 6, 6' are used which exhibit the same material thickness along their vertical extension, so that the tooth front 7 is oriented parallel to the relevant surface of the seat 4. It is clear that this depends per se upon the effective rake angle and its variation, so that the seat angles $\alpha$ at the seats could also be shaped in complete conformity and/or regularly if cutting material plates 6, 6' are used which are differently shaped. The cutting material plates 6, 6' may be constructed as shown in FIG. 1, mainly as first cutters (cutting material plates 6') and second cutters (cutting material plates 6). It is also not absolutely necessary for only two forms of cutting material plates to be provided. Three or more types are also entirely conceivable. However, cutting material plates 6, 6' of equal thickness are illustrated in FIGS. 1 to 3, so that the seat angle $\alpha$ of the seat 4 is identical with the effective rake angle $\gamma$ of the cutting material plates. The fastening of the cutting material plates 6, 6' to seats 4 of the projections 3 may be effected by welding, hard soldering, gluing et cetera.

The essential point is that the effective rake angles are varied. This is done from tooth to tooth and/or projection 3 to projection 3. In combination with this, the pitch t must also be varied. This is indicated in FIG. 1 by the different sized pitches $t_1 \neq t_2$ et cetera . . . $t_{n-1} \neq t_n$. In the exemplary embodiment illustrated the cutting edges 8, 8' are oriented transversely to the forward movement of the cutting material plates 6, 6' in the saw gap, so that the pitch is determined from cutting edge 8 to cutting edge 8' between two adjacent cutting material plates 6, 6' in each case. The cutting material plates 6 exhibit two tooth tips, as it were, and the cutting material plate 6' one tooth tip. When the cutting edges 8 or 8' are arranged obliquely to the direction of movement, it is recommended to determine and/or measure the pitch by the lateral projection of the cutting edges and/or cutting tips into a plane.

Within a saw blade, particularly a band-saw blade, a plurality of sequences of different pitches and a plurality of sequences of different effective rake angles will be mutually combined, whilst it is by no means necessary for the number of the pitches in the pitch sequence to conform to the number of the effective rake angles in an effective rake angle sequence. Conformity may however be chosen for the sake of simplified production. The cutting material plates 6, 6' are preferably finish-machined on all surfaces, so that no further finishing work is required after their attachment to the projections 3. The cutting material plates 6, 6' may obviously also exhibit different dimensions and external contours than those illustrated in FIG. 1. It is however to be understood that these cutting material plates 6, 6' project laterally beyond the width of the foundation 1 in all cases, so that lateral relief angles are formed and setting, with its attendant disadvantages, can be omitted. A tip relief angle is also observed.

FIG. 2 shows a detail of a circular-saw blade. Here again the combination of varying effective rake angles with varying pitch is realized.

A further form of construction of the invention is illustrated in FIG. 3 with reference to a band saw blade: cutting material plates 6, 6' constructed as first cutters and second cutters for example are used, which are constructed of equal thickness along their longitudinal extension, so that their front side, namely the tooth front 7, is oriented parallel to their rear side. Therefore the effective angle of the cutting material plates is $\beta=0$. The seats 4 are milled and/or upset in different manners, so that different seat angles $\alpha$ also result on the individual projections 3. This results in different effective rake angles $\gamma$, which conform to the relevant seat angles $\alpha$, because $\beta=0$. Here again, obviously, the pitch t is not made constant but variable. The advantage of this form of construction lies in using cutting material plates 6, 6' or also only cutting material plates of a single type, and nevertheless achieving different effective rake angles for a varying pitch.

Another form of construction of a band-saw blade is illustrated in FIG. 4. In this case, for a varying pitch, a constant seat angle $\alpha$ which may for example be 90°, is adopted. However, the cutting material plates 6, 6', 6" have rake angles which are different from 0 and $\neq$ const. Again in this manner it is possible to obtain varying effective rake angles $\gamma$ which are proportional to the relevant rake angle $\beta$ of each cutting material plate.

List of Reference Numerals

1 = foundation
2 = chip space
3 = projection
4 = seat
5 = tooth back
6 = cutting material plates
7 = tooth front
8 = cutting edge

We claim:

1. A saw blade comprising a foundation of spring steel, said foundation including an edge portion with a series of teeth formed therein at intervals therealong for cutting in the plane of the blade foundation, each of said teeth separated from its adjacent teeth by chip spaces with a seat formed on one edge of each tooth for supporting a cutting material plate and a tooth back formed on its other edge, said seats being formed at rake angles ($\alpha$) varying from tooth-to-tooth, a cutting material plate mounted to the seat of each tooth, each of said cutting material plates including a cutting edge oriented generally transverse to the plane of the blade foundation and at a location to effect a cutting action in the plane of the blade foundation and a front surface formed at substantially equal rake angles ($\beta$), with each cutting material plate mounted to the seat of a tooth to orient each tooth front surface at an effective rake angle ($\gamma$) different from the effective rake angle ($\gamma$) of the front surfaces of others of said cutting material plates, and said teeth being variably spaced along the edge portion of said foundation so that the pitch distance (t) between the cutting edges of some adjacent ones of said cutting material plates is different in comparison to the pitch distance (t) of other adjacent ones of said cutting material plates.

2. A saw blade according to claim 1, wherein the number of the different pitches in a pitch sequence conforms to the number of different rake angles in an effective rake angle sequence.

3. A saw blade according to claim 1, wherein the number of the different pitches in a pitch sequence is greater than the number of the different effective rake angles in an effective rake angle sequence.

4. A saw blade according to claim 1, wherein the number of the different pitches in a pitch sequence is smaller than the number of the different effective rake angles in an effective rake angle sequence.

5. A method of producing the saw blade of claim 1 comprising forming the foundation (1) of the blade with projections (3) of varying pitch and with variously inclined seats (4) on the projections (3), and attaching identical and non-identical cutting material plates of materially identical dimensions (6, 6') to the seats (4).

6. A method according to claim 11, whereby the seats (4) on the projections (3) for the cutting material plates (6, 6') are produced by milling and grinding in combination with a pressing and upsetting operation in order to vary the effective rake angle.

7. A method according to claim 2, whereby the cutting material plates (6, 6') are ground after their attachment to the seats (4) of the projections (3).

8. The saw blade of claim 1 and wherein the varying pitch distances (t) of the teeth within a sequence of teeth comprises a ratio of up to 1:2.5.

9. A method of producing a saw blade according to claim 1, comprising forming the foundation (1) with varying pitch of the projections (3) and variously inclined seats (4) on the projections (3), and attaching cutting material plates (6, 6') to the seats (4) so as to position the front surfaces of the teeth at varying effective rake angles ($\gamma$).

* * * * *